Aug. 4, 1970          R. S. PIFFATH ET AL          3,523,006
                   GAS FLOW REGULATOR FOR LIGHTER
Filed May 20, 1968                                2 Sheets-Sheet 1

INVENTORS,
RODNEY S. PIFFATH,
JOHN J. COLE
BY Lyon & Lyon
ATTORNEYS

Aug. 4, 1970     R. S. PIFFATH ET AL     3,523,006

GAS FLOW REGULATOR FOR LIGHTER

Filed May 20, 1968     2 Sheets-Sheet 2

INVENTORS,
RODNEY S. PIFFATH,
JOHN J. COLE

BY *Lyon & Lyon*

ATTORNEYS

United States Patent Office 3,523,006
Patented Aug. 4, 1970

3,523,006
GAS FLOW REGULATOR FOR LIGHTER
Rodney S. Piffath, Los Angeles, and John J. Cole, Beverly Hills, Calif., assignors to Butane Match Corporation of America, Beverly Hills, Calif., a corporation of Delaware
Filed May 20, 1968, Ser. No. 730,309
Int. Cl. F23d *15/02*
U.S. Cl. 431—344                          9 Claims

ABSTRACT OF THE DISCLOSURE

A gas lighter with a disposable fuel cartridge has a pressure regulator assembly which determines the maximum height of the flame, the assembly being mounted in the disposable fuel cartridge and comprising a series of disks mounted in a recess of fixed dimensions, one of the disks comprising a non-porous elastomer, and an adjacent disk being formed of porous material and positioned so that gas flow occurs radially through the latter disk. A screw connects the head assembly to the fuel cartridge, and relative turning movement along the screw threads causes the screw to pierce the cartridge to permit gas flow through the regulator assembly and to the flame port.

---

This invention relates to a gas lighter or candle using pressurized fuel, such as, for example, butane.

The principal object of this invention is to provide an improved lighter construction of this type having a minimum number of parts and particularly well suited for economical manufacture on a quantity production basis. Another object is to provide a device of this type which is rugged and dependable and not apt to get out of working order. Another object is to provide an improved flow regulator of maximum efficiency and minimum cost. Another object is to provide such a device in which the fuel tank or cartridge is disposable when the supply of fuel is exhausted, and a fresh cartridge readily installed.

These and related objects are achieved by providing a head assembly having a screw with a tapered end, and a cartridge containing fuel under pressure, and having an internally-threaded element for reception of the screw. Turning movement of the head assembly relative to the cartridge causes the screw to pierce the cartridge and allow pressurized fuel to pass along the helix path of the threads to an outlet port in the head assembly. The flow regulator assembly in the cartridge controls the maximum height of the flame, and turning movement of the head assembly with respect to the cartridge regulates the desired height of the flame and serves to extinguish it.

Other and more detailed objects and advantages will appear hereinafter.

Figure 1:
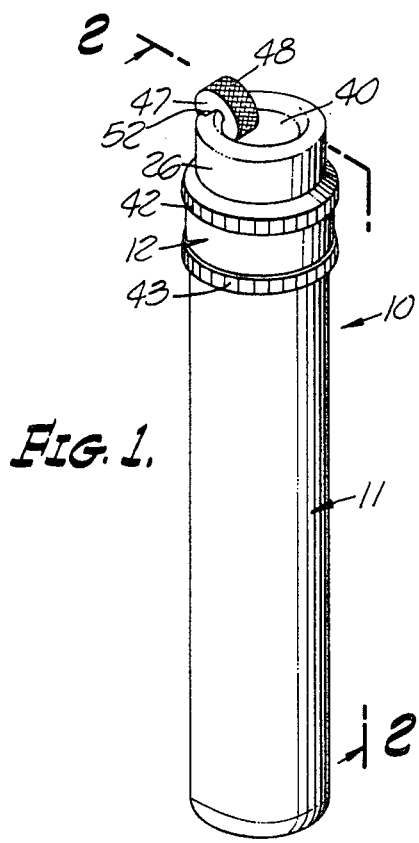
FIG. 1 is a perspective view showing a preferred embodiment of this invention.
Figure 2:
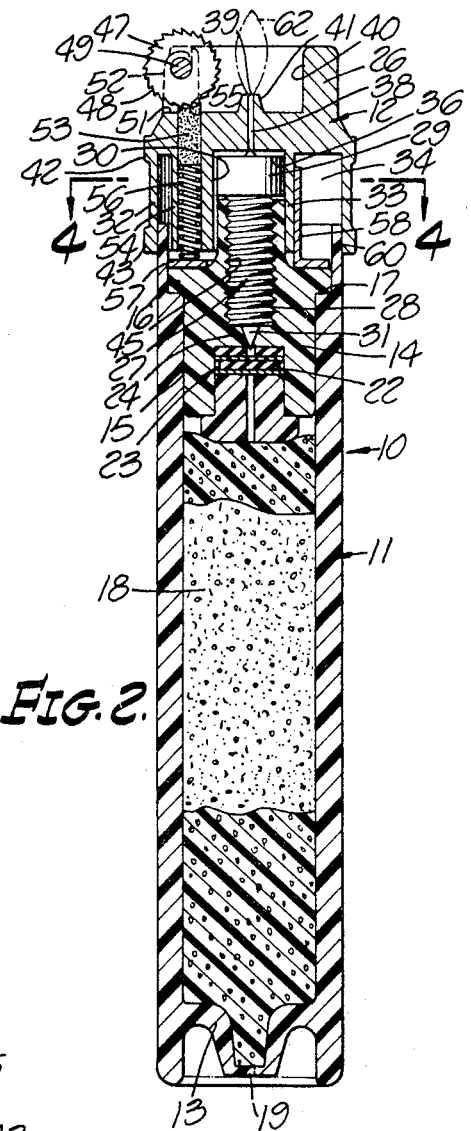
FIG. 2 is a longitudinal sectional view taken substantially on the lines 2—2 as shown in FIG. 1.
Figure 3:
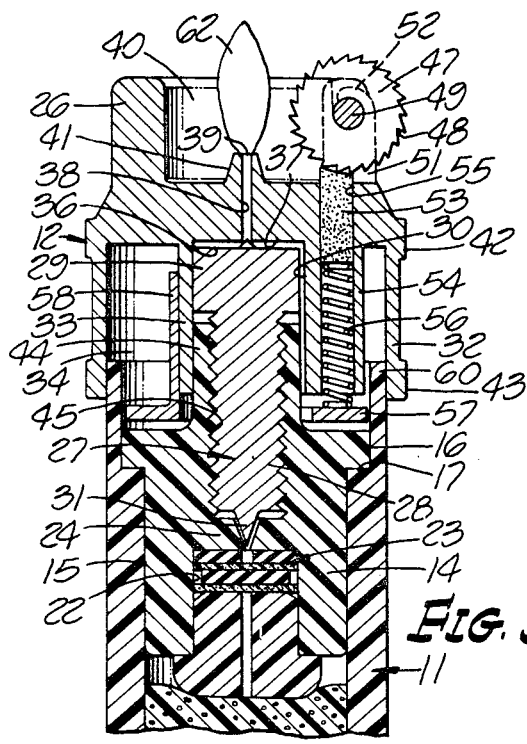

FIG. 3 constitutes an enlargement of the upper portion of FIG. 2.

Figure 4:
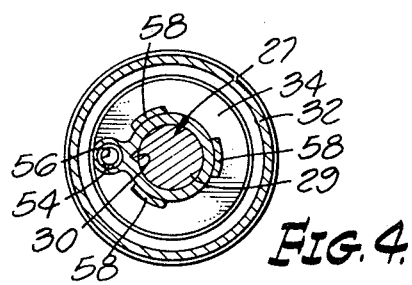

FIG. 4 is a transverse sectional view taken substantially on the lines 4—4 as shown in FIG. 2.

Figure 5:
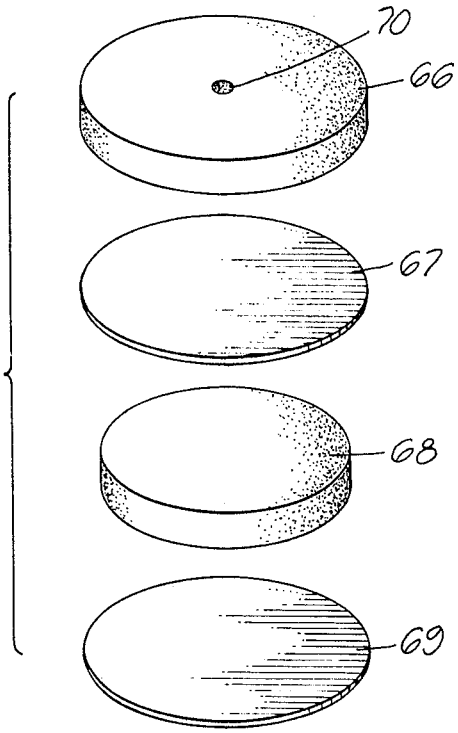

FIG. 5 is an exploded view showing the manner of assembly of the disks making up the flow regulator assembly.

Figure 6:
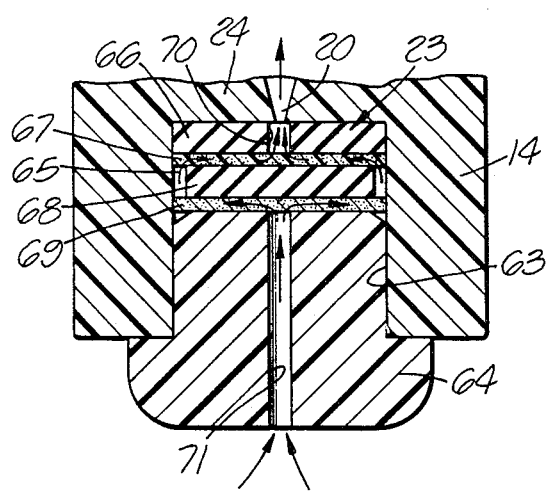

FIG. 6 is a sectional elevation on an enlarged scale, showing the disks assembled in a recess in the fuel cartridge, and showing the path of flow of gas.

Figure 7:
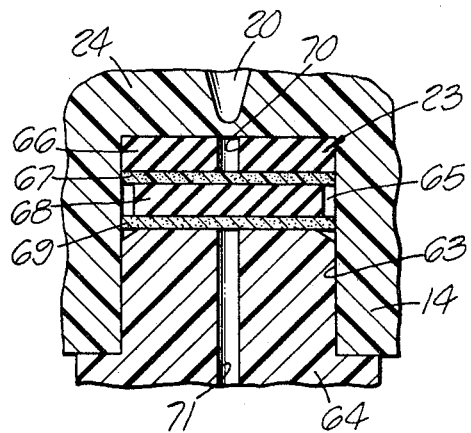

FIG. 7 is a view similar to FIG. 6 showing the barrier wall of the cartridge prior to being pierced by the tapered end of the screw.

Referring to the drawings, the lighter device generally designated 10 comprises a cartridge 11 containing fuel under pressure, and a head assembly 12. As shown in the drawings, the cartridge 11 comprises a cylindrical container or tank formed of thermoplastic material suitable for injection molding. One end of the cartridge 11 is closed by an end wall 13, and the other end is closed by a plug element 14, also formed of thermoplastic material. The plug element may be sealed to the wall of the cartridge 11 in any prefered or convenient manner. We have found that the conventional technique of spinning the plug element with respect to the cartridge to form a heat seal 15 gives satisfactory results. A flange 16 on the plug element 14 rests on a shoulder 17 on the cartridge 11.

The chamber 18 within the cartridge 11 may contain open cell polyether foam, and pressurized fuel such as butane fills the chamber 18 and the foam. A filling opening 19 in the bottom wall 13 provides for initial introduction of the fuel into the chamber 18, and the opening is later closed by a spinning process.

The closure element 14 is provided with an internal recess 22 which contains a pressure regulator assembly generally designated 23. This assembly 23 comprises a series of disks and is described in detail below. The barrier wall 24 of the closure element 14 is initially imperforate, as shown in FIG. 7, so that the pressurized fuel is confined within the cartridge 11 and cannot escape.

The head assembly 12 includes a head casting 26 and a metal screw 27 fixed to the casting. The casting 26 is designed so that it may be produced by low cost die casting procedures, and the screw 27 is a screw machine product. As best shown in FIG. 5, the screw 27 has a portion with external threads 28 and a smooth portion 29. The lower end of the screw 27 is provided with a tapered point 31. The casting 26 is provided with an outer peripheral skirt 32 and an inner concentric sleeve 33, defining an annular space 34 between them. As best shown in FIGS. 5 and 6, the wall 36 is provided with radiating channels 37. The screw 27 is assembled relative to the casting 26 by pressing the smooth portion 29 into the interior of the central sleeve 33 until the upper end of the screw 27 engages the end wall 36. The channel 30 in the wall of the sleeve 39 communicates with the channels 37 in the casting 26, and the latter communicate with the axial passage 38 which leads to the flame port or outlet port 39. The port 39 emerges into the recess 40 through a protuberance 41 projecting into the recess. After assembly, the casting 26 and screw 27 function as a single integral unit.

The casting 26 may be knurled or otherwise roughened on its outer surface, as shown at 42 and 43, to facilitate manual grasping of the head assembly 12 for turning it with respect to the cartridge 11. The plug element 14 is provided with a central upstanding tubular portion provided with internal threads 45. When the screw 27 is threaded into the plug element 14, the lower tapered end 31 first punctures the barrier wall 24. Turning movement of the head assembly 12 in the opposite direction then lifts the tapered end 31 of the screw to permit flow of fuel under pressure through the regulator assembly 23, and through the small opening 20 pierced in the barrier wall 24, and through the clearance space between the internal threads 45 and external threads 28. The screw threads thus form a helix path for flow of fuel under pressure to the upper end of the plug element 14. The fuel under pressure then flows upward through the axial channel 30 and radial channels 31 to the passageway 38 and to the outlet port 39.

Sparking means is provided for igniting the fuel escaping from the outlet port 39 to form a flame. As shown in the drawings, this sparking means includes a wheel 47 having a serrated periphery 48 and provided with oppositely extending integral hubs 49. These hubs 49 are received in aligned recesses 50 provided on the upper wall of the casting 26, and the wheel 47 extends through a slot 51. A portion of the wall 52 is deformed by a staking operation to retain both hubs 49 in position, to prevent disassembly. A solid cylinder of spark-producing material 53 is slidably mounted within the integral guide tube 54 provided on the head casting 26, and extends through the opening 55. The coil compression spring 56 within the tube 54 urges the member 53 in an upward direction to contact the periphery 48 of the wheel 47. The lower end of the spring 56 engages the flange 57 which is supported on the outer surface of the sleeve 33 by friction-gripping leg elements 58. It will be observed that the tube 54 and spring 56 are positioned in the annular space 34 between the skirt 32 and the central sleeve 33. The skirt telescopes over the upward extending rim 60 to exclude foreign matter from the annular space 34.

A bore 63 in the lower portion of the plug element 14 is closed by an apertured member 64 to form a recess 65 for reception of the flow regulator assembly generally designated 23. As shown in the drawings, this assembly 23 comprises disks 66, 67, 68, 69. Disks 66 and 68 are formed of a non-porous elastomer which the gas does not penetrate. The disk 66 has a small central hole 70 aligned with the pierced opening 20. The disk 69 is formed of paper, such as for example newsprint. Disk 67 is formed of porous material, such as for example Dacron. Disks 66, 67 and 69 fit within the bore 63, but the disk 68 is slightly smaller in diameter, so that an annular space is formed between the periphery of the disk 68 and the bore 63.

The flow pattern through the flow regulator assembly 23 is shown in FIG. 6. Gas enters the central opening 71 in the member 64 and flows radially outward through the material of the paper disk 69 into the annular space around the imperforate disk 68. Gas then flows radially inward through the interstices of the porous Dacron disk 67, and into the central opening 70 in the disk 66 and through the pierced opening 20. It has been found that the regulator assembly 23 constructed in this manner is very inexpensive and yet provides accurate regulation of the maximum pressure which can escape through the pierced opening 20. Thus, the maximum height of the flame is controlled by this flow regulator assembly. Moreover, temperature variations and changes in pressure of the fuel within the cartridge have minimal effect on the output pressure under flow conditions.

In operation, the cartridge 11 is connected to the head assembly 12 by relative turning movement along the threads 28 and 45, to cause the tapered end 31 of the screw 27 to puncture the barrier wall 24, as described above. The head assembly 12 is then turned in the opposite direction for a part of one revolution to permit gas under pressure to escape through the outlet port 39. The sparking wheel 47 is then manually rotated to ignite the fuel and form a flame 62 at the outlet port 39. The protuberance 41 keeps the flame spaced from the floor of the recess 40 to minimize transfer of the heat into the head casting 26. The height of the flame 62 is adjusted by turning of the head assembly 12 with respect to the cartridge 11; this relative turning movement changes the spacing of the tapered end 31 of the screw with respect to the opening 20 which it has pierced in the barrier wall 24, and this tapered portion 31 serves as a valve to regulate the height of the flame 62. In order to extinguish the flame, the head assembly 12 is turned with respect to the cartridge 11 to move the tapered end 31 of the screw 27 back into the barrier wall opening to shut off all flow of gas.

When the supply of fuel has been exhausted from the cartridge 11, the head assembly 12 is unscrewed from the cartridge and the cartridge is thrown away. A new duplicate cartridge having a supply of fuel under pressure is then threadedly connected by inserting the screw 27 into the internal threads 35 and then turning the head assembly 12 to cause the tapered end 31 to pierce the barrier wall 24. Subsequent operation of the lighter device 10 is the same as that previously described. When it is necessary to install a new solid cylinder 53 of sparking material, the head assembly 12 is unscrewed from the cartridge 11 to expose the flange 57. The flange is then manually moved in a direction away from the outlet port 39, the friction legs 58 sliding on the outer surface of the central sleeve 33. The spring 56 may then be withdrawn axially from the tube 54, and a new solid cylinder 53 of sparking material inserted into the open end of the tube. The spring 56 and flange 57 are then reassembled, and the head assembly 12 is reinstalled on the cartridge 11.

Having fully described our invention, it is to be understood that we are not to be limited to the details herein set forth but that our invention is of the full scope of the appended claims.

We claim:

1. In a lighter, the combination of: a sealed cartridge containing fuel under pressure and having an internally-threaded element at one end, a head assembly having an outlet port and a central externally-threaded screw for threaded reception within said cartridge element, a screw having an end portion adapted to pierce a portion of said cartridge upon relative turning movement of the cartridge and head assembly, a flow regulator assembly in the cartridge adjacent the latter said cartridge portion, said flow regulator assembly comprising a series of stacked disks mounted in a recess of fixed dimensions, at least one of the disks comprising a non-porous elastomer, and an adjacent disk being formed of porous material, the disks being arranged so that flow from the interior of the cartridge through the regulator assembly is required to pass radially through the porous disk, and passage means including a passageway in the head assembly for carrying fuel from the pierced cartridge through the passage means to the outlet port.

2. In a lighter, the combination of: a sealed cartridge containing fuel under pressure and having an internally-threaded element at one end, a head assembly having an outlet port and a central externally-threaded screw for threaded reception within said cartridge element, a screw having an end portion adapted to pierce a portion of said cartridge upon relative turning movement of the cartridge and head assembly, walls forming a recess of fixed dimensions in the cartridge adjacent the latter said cartridge portion, a flow regulator assembly comprising a series of stacked aligned disks mounted in said recess, at least one of the disks comprising a non-porous elastomer, and an adjacent disk being formed of porous material, the disks being arranged so that flow from the interior of the cartridge through the regulator assembly is required to pass radially through the porous disk, and passage means including a passageway in the head assembly carrying fuel from the pierced cartridge through the passage means to the outlet port.

3. The combination set forth in claim 2 in which the porous disk is positioned between two non-porous elastomeric disks, the first non-porous elastomeric disk fitting within the walls of the recess and being positioned adjacent the said portion of the cartridge to be pierced and provided with a central opening, the second non-porous elastomeric disk being of smaller external dimensions than the first non-porous elastomeric disk, so that flow through the porous disk occurs radially inwardly.

4. For use with a lighter of the type described, the combination of: a cartridge containing fuel under pressure, walls forming a recess of fixed dimensions within the cartridge in the path of flow of fuel from the cartridge, a flow regulator assembly comprising a series of stacked aligned disks mounted in said recess, one of the disks comprising a non-porous elastomer, and an adjacent disk being formed of porous material and the disks being arranged so that flow from the interior of the cartridge through the regulator assembly is required to pass radially through the porous disk.

5. The combination set forth in claim 4 in which the porous disk is positioned between two non-porous elastomeric disks, the first non-porous elastomeric disk fitting within the walls of the recess and provided with a central opening, the second non-porous elastomeric disk being of smaller external dimensions than the first non-porous elastomeric disk, so that flow through the porous disk occurs radially inwardly.

6. The combination set forth in claim 5 in which a fourth disk is provided which is also porous and which is located upstream from the second non-porous elastomeric disk.

7. For use with a lighter of the type described, the combination of: a sealed cartridge containing fuel under pressure and having a barrier wall adapted to be pierced to permit flow of fuel from the cartridge, walls forming a recess of fixed dimensions within the cartridge adjacent said barrier wall, a flow regulator assembly comprising a series of stacked aligned disks mounted in said recess, one of the disks comprising a non-porous elastomer, and an adjacent disk being formed of porous material and the disks being arranged so that flow from the interior of the cartridge through the regulator assembly is required to pass radially through the porous disk.

8. The combination set forth in claim 7 in which the porous disk is positioned between two non-porous elastomeric disks, the first non-porous elastomeric disk fitting within the walls of the recess and being positioned adjacent the said portion of the cartridge to be pierced and provided with a central opening, the second non-porous elastomeric disk being of smaller external dimensions than the first non-porous elastomeric disk, so that flow through the porous disk occurs radially inwardly.

9. For use with a lighter of the type described, a flow regulator comprising, in combination: walls forming a recess of fixed dimensions, a series of stacked aligned disks mounted in said recess, one of the disks comprising a non-porous elastomer, and an adjacent disk being formed of porous material and positioned between two non-porous disks, at least one of which comprises an elastomer, the first non-porous disk fitting within the walls of the recess and provided with a central opening, the second non-porous disk of small external dimensions than the first non-porous disk, so that flow through the regulator requires radial flow through the porous disk.

References Cited

UNITED STATES PATENTS

| | | | |
|---|---|---|---|
| 3,174,310 | 3/1965 | Genoud | 431—277 |
| 3,292,396 | 12/1966 | Zellwedger et al. | 431—277 |

EDWARD G. FAVORS, Primary Examiner

U.S. Cl. X.R.

222—91; 431—277